Sept. 8, 1959 C. M. WALTON 2,903,003
GOVERNOR OPERATED VALVE
Filed April 16, 1957 2 Sheets-Sheet 1

INVENTOR.
Charles M. Walton
BY
Connolly and Hutz
ATTORNEYS

Sept. 8, 1959 C. M. WALTON 2,903,003
GOVERNOR OPERATED VALVE
Filed April 16, 1957 2 Sheets-Sheet 2
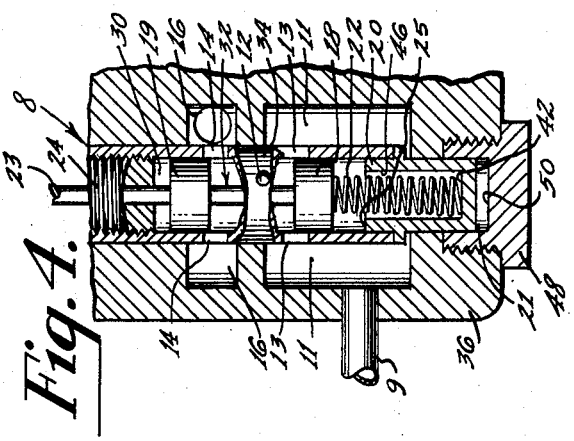
Fig. 4.
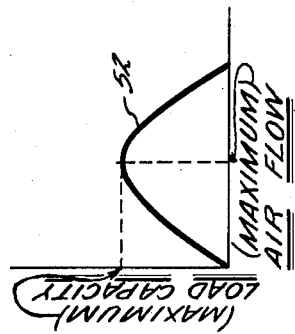
Fig. 6.
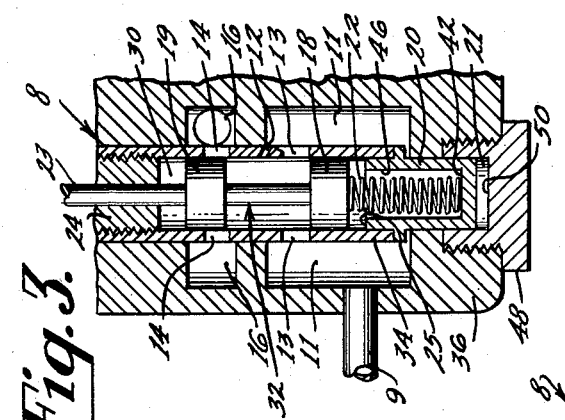
Fig. 3.
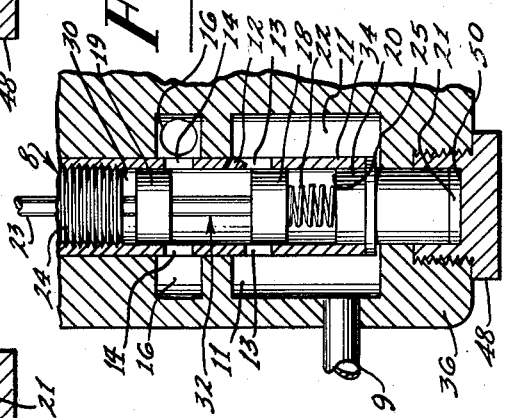
Fig. 5.
Fig. 2.
INVENTOR.
Charles M. Walton
BY
Connolly and Hutz
ATTORNEYS

United States Patent Office 2,903,003
Patented Sept. 8, 1959

2,903,003

GOVERNOR OPERATED VALVE

Charles M. Walton, Greenwell Springs, La.

Application April 16, 1957, Serial No. 653,237

9 Claims. (Cl. 137—33)

This invention relates to a governor operated valve for regulating the flow of a supply of fluid to a fluid-operated device, and more particularly relates to such a valve for controlling the speed of a pneumatically operated tool such as a portable pneumatic grinder or drill.

The problem of governing the speed of a fluid-operated device such as a pneumatically operated tool is made rather difficult by the widely varying loads imposed upon such a device under normal operating conditions. Light or no load conditions exist, for example, when a tool such as a disc sander or a grinding wheel rotates freely before being applied to the work. Full load is imposed, for example, when a grinding wheel is applied at normal operating pressure to the work. Conventional centrifugal governors for controlling the rate of fluid supplied through a fluid supply valve have been used for quite some time to attempt to maintain the rotational speed of such tools substantially constant regardless of the applied load. The extreme rapidity of load changes under normal operating conditions, however has made it impossible for such a governor to maintain speed substantially constant and prevent over-speeding when the applied load suddenly fluctuates.

An object of this invention is to provide a governor operated valve which maintains the rotational speed of a fluid-operated device substantially constant and prevents overspeeding regardless of rapidly varying load conditions.

Another object is to provide such a valve which is simple and economical to manufacture and which is suitable for use in conjunction with existing governors and fluid-operated devices.

In accordance with this invention, a highly efficient governor operated valve includes a valve element movably disposed within a chamber including an inlet port and an outlet port. This valve element includes flow obstructing elements which are aligned with the valve ports to provide a predetermined maximum effective passageway through the valve when the valve element is disposed intermediate its extremities of travel in response to high and low demand regulating movement of the governor. Movement of the valve element to either of its extremities of travel provides an effective flow passageway less than the aforementioned predetermined maximum.

At the extremity of travel which the valve element assumes when the governor is at a high fluid demand condition, one of the flow obstructing elements may substantially close off the effective flow passageway through the valve. A small amount of flow is still allowed, however, to permit a device to be started. This small amount of fluid flow is provided by a bypass around or through the valve.

When the fluid operating device comes up to speed under light or no load conditions, the governor takes control and moves the obstructing elements in a low demand direction which first increases the effective flow passageway and then decreases it. Under smoothly applied full load conditions, the governor moves the valve obstructing elements in a high demand direction to a position where maximum effective flow passageway is provided through the valve. This maximum effective flow passageway is sized to provide a flow of fluid which corresponds to optimum full load operation at rated speed of a device driven by the supplied fluid. If the device overloads and slows down, the governor continues moving the valve in the high demand direction past the position of maximum effective flow passageway. This further movement in the high demand direction, therefore, decreases the effective flow passageway, which prevents provision of a supply of fluid great enough to operate the device at rated speed under overload conditions. Furthermore, any sudden high demand movement of the valve will move it to and past the predetermined maximum effective flow passageway position. Full fluid flow to operate the device at rated speed and load can, therefore, only be obtained if the load is properly applied, and any over-speeding is absolutely prevented.

Novel features and advantages of the present invention will become apparent to one skilled in the art from a reading of the following description in conjunction with the accompanying drawings wherein similar reference characters refer to similar parts and in which:

Figs. 2–5 are cross-sectional views in elevation of the embodiment shown in Fig. 1 in illustrative phases of operation; and Fig. 6 is a graph showing fluid flow characteristics of an embodiment of this invention under varying load.

Figure 1:
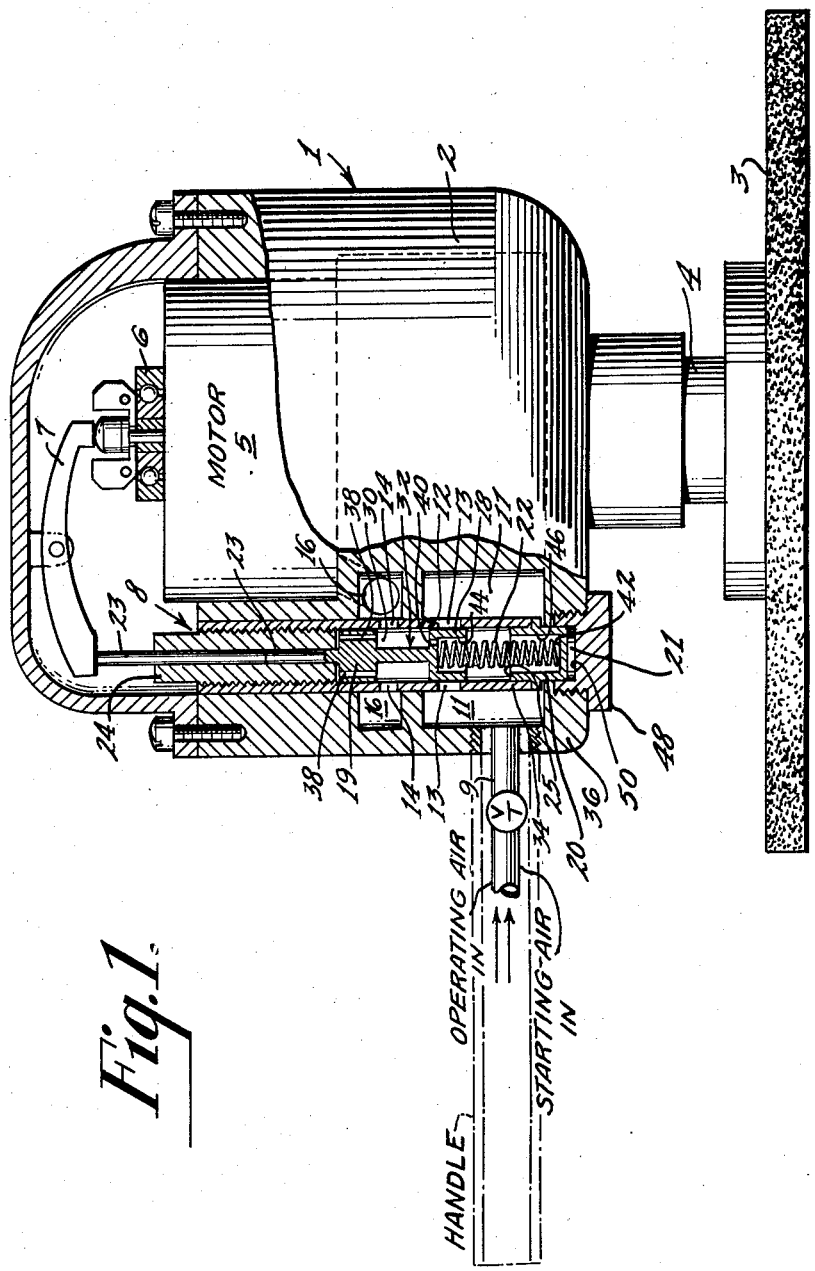
Fig. 1 is a view in elevation partially in cross-section of one embodiment of this invention in conjunction with a representative fluid-operated device and governor.

In Fig. 1 is shown a fluid-operated device 1, for example a pneumatically operated portable grinder 1 including a main housing 2. A tool, for example, a grinding wheel 3 is mounted on an operating shaft 4 extending from the front of housing 2. A pneumatically driven motor 5 is mounted adjacent or within housing 2. A governor 6, for example, of the centrifugal type is operatively connected and mounted upon motor 5 and is connected to actuate coupling means, for example, valve stem extension 23 through a pivoted lever arm 7. Extension 23 is part of a governor operated valve 8 (later described in detail) which controls the air fed to device 1 through air supply pipe 9. Fluid-operated motor 5, for example, is the type of motor shown in U.S. Letters Patent 2,326,396, and governor 6 is substantially the same type of centrifugal governor shown in that same patent.

In Figs. 2–5 are shown details of governor-operated valve 8 in various phases of operation. Valve 8 includes a valve chamber 30, cylindrical for example, including an inlet port 13 and an outlet port 14, for example, longitudinally spaced from each other. A valve element 32 is movably disposed within chamber 30. Valve element 32 includes obstructing elements 18 and 19 respectively aligned in a manner to be later explained with inlet port 13 and outlet port 14. Valve element 32 also includes a stem 23 which, for example, rigidly connects obstructing elements 18 and 19 at a predetermined spacing and also extends through block 24 which forms one end of chamber 30.

Valve chamber 30 is formed, for example, within a cylindrical sleeve 34 inserted within housing 36. Housing 36 includes an inlet chamber 11 connected to inlet port 13 and an outlet chamber 16 connected to outlet port 14. A bypassing flow passageway 12 is formed, for example, by orifice 12 extending through the wall of sleeve 34 between inlet port 13 and outlet port 14. Orifice 12, for example, is positioned adjacent inlet port 13 slightly removed from the position which obstructing element 18 assumes when moved to a high demand extremity of travel by governor 6 as is later described in detail. Ports 38 and 40 are respectively provided through flow obstructing elements 19 and 18 to equalize the pressure in all portions of chamber 30 to facilitate movement of valve element 32 in response to actuation by governor 6.

A resilient means 22, for example, a compression spring, is disposed between valve element 32 and the adjacent end 42 of chamber 30. Spring 22 is mounted, for example, within a cup 20 which forms an end of chamber 30.

Spring 22, for example, reacts between recess 44 within flow obstructing element 18 and recess 46 within cup 20. Cup 20 provides means for closing one end of chamber 30 and is mounted within an access plug 48 which is threaded into housing 36. A cushioning gasket 21 of neoprene, for example, is inserted between the end of cup 20 and the adjacent end 50 of plug 48.

The upper edge or lip 25 of cup 20 forms a stop which arrests valve element 32 with element 19 blocking off port 14 in the event that spring 22 should break. This would effectively completely shut off all air flow and stop the driven tool to provide emergency protection.

The spacing of the valve elements 19 and 18 and inlet and outlet ports 13 and 14 and bypass flow passageway 12 are best explained by reference to Figs. 2-5 which show these parts in various phases of operation.

Fig. 2 shows valve 8 in the position which it assumes before the tool is started. Since governor 6 is not rotating, stem 23 is allowed to move upward to an extreme high fluid demand position. In this position, however, flow obstructing element 18 fully covers inlet port 13 which effectively closes off almost all of the effective flow passage through valve 8 even though flow obstructing element 19 is completely above and clear of outlet port 14. A small amount of air, however, flows through low capacity bypass orifice 12. This small amount of air is sufficient, for example, to operate grinding wheel 3 under light or no load conditions. Orifice 12, for example, is 7/64 inch in diameter which admits enough air under a 95 p.s.i. pressure to operate grinding wheel 3 at 4100 r.p.m.

Fig. 3 shows valve 8 in the position which it assumes after device 1 has come up to speed. Valve element 32 has been moved downward by the governor which is now under a low fluid demand condition and causes flow obstructing element 19 to substantially close off most of outlet port 14. At the same time flow obstructing element 18 has been moved downward and clear of inlet port 13.

Fig. 4 shows valve 8 when full optimum rated load is applied to device 1. Governor 6 has moved upward to a higher fluid demand condition and has moved valve 32 to a position in which outlet port 14 and inlet port 13 are respectively half uncovered by flow obstructing elements 19 and 18. The maximum effective flow passageway through valve 8 is provided at this time and it is constructed, arranged and sized to provide a flow of fluid which corresponds to optimum full load operation of tool 1 at its rated speed, for example, 4500 r.p.m. A highly efficient predetermined maximum effective flow passageway is provided at the time when the combined effective passageway through inlet port 13 and bypass 12 are substantially equal to the passageway through outlet port 14.

Fig. 5 shows valve 8 in the position when an overload or a sudden load of any kind is applied to tool 1. Fluctuating load conditions are particularly troublesome in performing precision grinding where the tool is securely bolted down and cannot conform to high and low spots as does occur in hand operation. Flow element 32 has been influenced to move upward to or near its high demand extremity of travel which moves flow obstructing element 19 substantially clear of outlet port 14, but at the same time flow obstructing element 18 is moved to a position blocking inlet port 13. This serves to decrease the effective flow passageway through the valve even though the governor is in an extreme high fluid demand condition.

It is, therefore, apparent that the predetermined maximum effective flow passageway through the valve is provided in the position shown in Fig. 4 in which valve element 32 is positioned at a predetermined position intermediate its high and low fluid demand extremities of travel.

Operation

Referring to Figs. 2-5, in conjunction with the graph in Fig. 6, it is apparent that the maximum effective flow passageway through the valve is only provided at a predetermined intermediate position of valve 32 between the high and low fluid demand extremities of travel of governor 6. This maximum which is illustrated at the peak of the curve 52 in Fig. 6 can only be obtained when the optimum load is applied to the tool 1. When tool 1 is a portable grinder, for example, this optimum load is provided when the grinding wheel 3 is pressed against the work at rated pressure. If an overload is applied to the grinding wheel 3, for example, by striking a hard projection, or by pressing it too forcefully against the work, the effective flow passageway through valve 8 decreases even though the governor and valve is moved in the high fluid demand direction illustrated in Fig. 5. This prevents overspeeding when the overload is released because the effective flow passageway has been diminished in anticipation of such release.

Furthermore, any sudden fluctuation in load applied to the valve will cause it to diminish its effective flow passageway. This prevents the passage of full load air capacity unless the tool is brought smoothly up to full load operation. This valve, therefore, inherently insures careful and smooth application of load to the fluid-operated device. It has been found in actual service that devices which, for example, heretofore had fluctuated in operating speed over a range from a low speed of 4,000 r.p.m. to an overload speed of 8,000 r.p.m. are maintained substantially constant in operating speed. If the governor is set at 4,500 r.p.m., for example, this speed will not be exceeded under any circumstances, and an extremely slight variation, for example, from 4100 r.p.m. to 4500 r.p.m. is consistently maintained.

The operation of this valve might be best described by comparing the peak of the curve shown in Fig. 6 to a slippery hill at whose summit is a reward. If the hill is climbed slowly and carefully, the reward of full capacity at rated speed can be obtained. If the hill is climbed too swiftly or abruptly the operator will slide down the reverse slope and not be able to perch himself at the summit where it is possible to obtain the reward of full load capacity at rated speed. Oversliding of the peak is also caused when the operator asks for too much from his tool and tries to overload it.

What is claimed is:

1. In combination, a fluid-operated device, a governor for controlling the speed of said device comprising a valve chamber mounted upon said device, an inlet port in said chamber for admitting fluid thereto, an outlet port in said chamber for allowing fluid to flow from said chamber to said device, a valve element movably disposed within said chamber, said valve element including coupling means for connecting said valve element to be moved in response to regulating motion of a governor, said valve element including flow obstructing elements, said flow obstructing elements being constructed and arranged to be aligned with said ports to provide a predetermined maximum effective flow passageway through said chamber when disposed at a predetermined position intermediate its extremities of travel which correspond to high and low demand positions of said governor, said predetermined maximum effective flow passageway corresponding to an optimum speed of said device when operated under full load, said flow obstructing elements being constructed and arranged to become misaligned with said ports to provide progressively decreasing effective flow passageways when moved past said predetermined positions towards either of said extremities of travel, said flow obstructing elements and said ports being constructed and arranged to become misaligned with said ports to provide full closure of said flow passageway when said governor assumes a high demand position, conduit means being connected to said inlet port and said outlet port for respectively conducting fluid to said valve and from said valve to a device which it operates, and low capacity flow passageway means being provided between said inlet and said outlet ports for bypassing said valve to provide a limited flow of fluid to said device which is insufficient to permit overspeeding when said obstructing elements provide full closure of the flow passageway through said valve in response to said movement of said governor to a high fluid demand position.

2. The combination as set forth in claim 1 wherein said flow obstructing elements incorporate substantially balanced areas upon opposite surfaces and pressure equalizing passageways connecting said areas for balancing and cancelling the forces applied to said valve element by said fluid.

3. The combination as set forth in claim 2 wherein said chamber is comprised of a cylindrical cavity including longitudinally separated inlet and outlet ports, said valve elements being comprised of a pair of rigidly connected cylindrical obstructing elements which are spaced a distance apart sufficient to simultaneously provide full opening of said outlet port with full closure of said inlet port and simultaneous partial opening of said outlet port and said inlet port.

4. The combination as set forth in claim 3 wherein said valve chamber is comprised of a cylindrical sleeve inserted within a housing, said housing including an inlet chamber connected to said inlet port and an outlet chamber connected to said outlet port, and a low capacity bypassing passageway which connects said inlet chamber with said outlet chamber is disposed in said sleeve.

5. The combination as set forth in claim 4 wherein said coupling means is comprised of a valve stem extending through a wall of said chamber.

6. The combination as set forth in claim 3 wherein said inlet and outlet flow obstructing elements are separated from each other a distance which provides approximately half-opening of said outlet port and said inlet port.

7. The combination as set forth in claim 4 wherein said effective flow passageway through said valve is substantially at a predetermined maximum when the combined effective passageway through said inlet and said bypass passageway are substantially equal to the passageway through said outlet.

8. The combination as set forth in claim 2 wherein a resilient element is disposed between the end of said valve chamber and said valve element to balance the pressure of said governor upon said valve element and to bias said valve to an extremity of travel.

9. The combination as set forth in claim 8 wherein said end of said valve chamber is cup-shaped and includes a recess, said resilient element is comprised of a compression spring disposed within said recess, and the lip of said cup is spaced relative to said valve element and said ports in position to arrest said valve element with an obstructing element blocking a port to shut off the flow of fluid if said spring should break.

References Cited in the file of this patent

UNITED STATES PATENTS

| | | |
|---|---|---|
| 1,123,273 | Gregersen | Jan. 5, 1915 |
| 1,401,320 | Darling | Dec. 27, 1921 |
| 2,670,725 | Cummins | Mar. 2, 1954 |

FOREIGN PATENTS

| | | |
|---|---|---|
| 411,053 | Germany | Mar. 23, 1925 |